Figure 1:
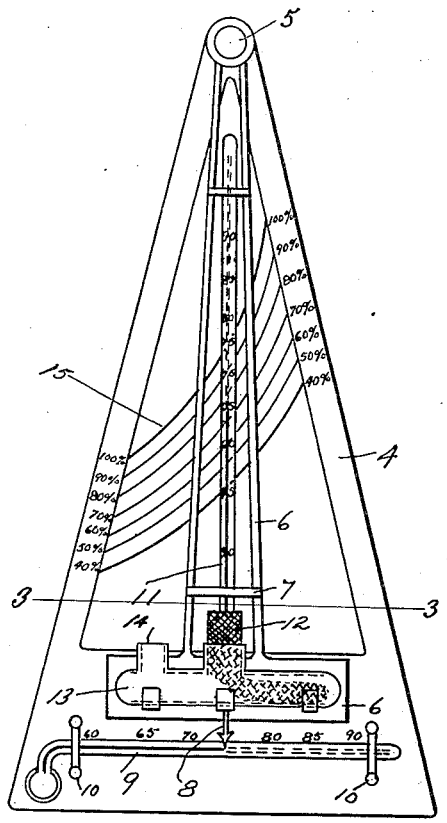

Sept. 15, 1925.

F. G. STRUBIN 1,553,484

HYGROMETER

Filed March 3, 1924

INVENTOR.
Felix G. Strubin
BY
Henry Molz.
ATTORNEY.

Patented Sept. 15, 1925.

1,553,484

UNITED STATES PATENT OFFICE.

FELIX G. STRUBIN, OF LOS ANGELES, CALIFORNIA.

HYGROMETER.

Application filed March 3, 1924. Serial No. 696,557.

*To all whom it may concern:*

Be it known that I, FELIX G. STRUBIN, a subject of the Republic of Switzerland, residing at Los Angeles, county of Los Angeles, and State of California, have invented a new and useful Hygrometer, of which the following is a specification.

My invention relates to improvements in hygrometers, based on the readings of two thermometers in conjunction with the readings indicated upon frames upon which said thermometers are suitably mounted; and the objects of my improvement are, first, to provide a hygrometer readily indicating the percentage of relative humidity of the air, in a single operation; and, second, to provide such an instrument permitting its indications to be read without intermediate readings and numerous manipulations.

Hygrometers heretofore invented are of several kinds, and operate on either one of the following principles. The expansion of a string or wick by the humidity of the air, or in the difference in the readings indicated by a dry bulb and a wet bulb thermometer; the former giving very unsatisfactory results, the other quite accurate, but embracing considerable detail, and being otherwise inconvenient in its operation.

My invention eliminates these objectionable features, in that but one operation is necessary—that of bringing a pointer attached to a pivotally connected frame in alignment with the point of stoppage of the mercurial element of a thermometer mounted on another frame, as illustrated in the drawing. I use two thermometers, one of which is attached in a horizontal position to a metal frame, said frame having a series of lines and figures engraved thereon to indicate in percentages, various degrees of the relative humidity of the air. The other thermometer is mounted in a vertical position on another frame, one end of which has the aforesaid arrow or pointer attached thereto, while the other end is pivotally connected to the upper end of the other frame; this pivot connection making it possible to move said frame across the front or face of the other, so that the pointer attached thereon can be placed in alignment with the thermometer reading as aforesaid.

Attached to this pivoted or swinging frame is also a liquid containing chamber or water bottle, the same having two apertures, one thru which the bottle is filled, the other providing a suitable means for extending a wick therefrom, said wick functioning to convey by capillary attraction the contents of the bottle (water) up to and around the bulb of the thermometer mounted on the same frame, and by this means assuring a lower temperature reading from this thermometer than is obtained from the other not so provided; the difference between the two readings being indicative of the relative humidity of the air, this in theory being the method in which the humidity is ascertained, but in its practical operation, no consideration thereof is taken, the reading being taken more direct by simply moving the pointer in alignment with the position of the mercury in the horizontally mounted thermometer, and thence sighting the position of the top or level of the mercury in the vertically mounted thermometer, and tracing the same across one of the engraved lines on the frame—the line corresponding with the level of the mercury in the thermometer, the figure shown at either end of said line denoting the humidity.

I attain these objects by the combination and methods of operation of the devices and parts illustrated in the accompanying drawing, in which—

Figure 2:
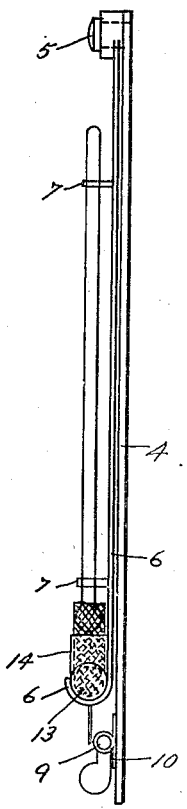
Figure 3:
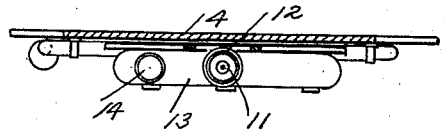

Figure 1 is a front elevation of my hygrometer; Fig. 2, a side elevation of Fig. 1, and Fig. 3, a section taken on the line 3—3 of Fig. 1.

Similar numerals refer to similar parts throughout the several views.

Referring to the drawing, 4 represents the main or stationary frame of my invention, 5 a trunnion fastened in said frame, and on which the swinging frame 6 is mounted. One thermometer glass 11 is supported in the swinging frame 6 by clamps 7, and another thermometer glass 9 is mounted in the stationary frame 4 being held in position by clamps 10. The bottom of the frame 6 is arranged to support a bottle 13 containing water into which a wick 12 dips, conveying the water by capillary attraction up to and around the bulb of the thermometer glass 11, the bottle being supplied with water through the opening 14. Depending downward from the bottom of the frame is an arrow or pointer 8, the function of the said pointer being to place the thermometer on the pivoted or swinging frame in alignment with the position of the mercury in the thermometer mounted on the other or stationary frame, and thus placing both thermometers in a definite relation. Mounted on both sides of the stationary frame 4 is a scale from which the humidity readings are taken, the reading being determined by the position of the mercury in the swinging frame thermometer and its coincidence with one of the lines 15.

It will be understood that this instrument can be made in any desired size and that the proportions of its various parts depends entirely on the accuracy of the results and the interval of the temperature indications desired in the different uses to which it may be put.

I am aware that some changes may be made in the general arrangement and combination of the instrument, as well as in the details of the construction of the same, without departing from the scope of the present invention as set forth in the foregoing specification, and as defined in the claims which are appended thereto. Hence, I do not limit my present invention to the exact arrangement and combinations of the devices and parts as described in said specification, nor do I confine myself to the exact details of the construction of the said parts as illustrated in the accompanying drawings.

I claim:—

1. In an instrument of the class described comprising in combination with a dry bulb and a wet bulb thermometer, a supporting frame having inscribed thereon a series of lines and figures representing a humidity scale, a pointer pivotly connected to said frame and extending downwardly therefrom, and constituting a means for positioning the wet bulb thermometer in proper relationship to the said humidity scale as determined by the reading on the dry bulb thermometer.

2. In an instrument of the class described, comprising in combination with a dry bulb and a wet bulb thermometer attached to separate frames pivotably connected to each other, a pointer pivotly connected to one of the said frames and functioning to position the wet bulb thermometer in proper relationship to a humidity scale inscribed on the face of the frame to which the dry bulb thermometer is attached, said position being determined by the reading on the dry bulb thermometer.

In testimony, that I claim the invention set forth above I have hereunto set my hand this 23 day of February, 1924.

FELIX G. STRUBIN.